United States Patent
Ennabli et al.

(10) Patent No.: US 12,367,372 B2
(45) Date of Patent: Jul. 22, 2025

(54) RFID ASSEMBLY

(71) Applicant: ASSA ABLOY AB, Stockholm (SE)

(72) Inventors: Elies Ennabli, Lausanne (CH); Eric Suligoj, Froideville (CH)

(73) Assignee: ASSA ABLOY AB, Stockholm (SE)

( * ) Notice: Subject to any disclaimer, the term of this patent is extended or adjusted under 35 U.S.C. 154(b) by 54 days.

(21) Appl. No.: 17/757,654

(22) PCT Filed: Nov. 27, 2020

(86) PCT No.: PCT/EP2020/083735
§ 371 (c)(1),
(2) Date: Jun. 17, 2022

(87) PCT Pub. No.: WO2021/121910
PCT Pub. Date: Jun. 24, 2021

(65) Prior Publication Data
US 2023/0019696 A1 Jan. 19, 2023

(30) Foreign Application Priority Data
Dec. 20, 2019 (EP) ..................................... 19218549

(51) Int. Cl.
*G06K 19/077* (2006.01)
(52) U.S. Cl.
CPC . *G06K 19/07767* (2013.01); *G06K 19/07728* (2013.01); *G06K 19/07786* (2013.01)
(58) Field of Classification Search
CPC ......... G06K 19/07767; G06K 19/0724; G06K 19/07728; G06K 19/07786;
(Continued)

(56) References Cited

U.S. PATENT DOCUMENTS

| 6,975,834 | B1 * | 12/2005 | Forster | ...................... | H01Q 1/22 |
|---|---|---|---|---|---|
| | | | | | 455/279.1 |
| 2006/0232419 | A1 * | 10/2006 | Tomioka | .......... | G06K 19/07749 |
| | | | | | 340/572.7 |

(Continued)

FOREIGN PATENT DOCUMENTS

| CN | 106951952 A | * | 7/2017 | |
|---|---|---|---|---|
| EP | 3260824 A1 | * | 12/2017 | ........... G01F 23/284 |

(Continued)

OTHER PUBLICATIONS

Singh, "Micro strip Patch Antenna and its Applications: a Survey" (Year: 2011).*

(Continued)

*Primary Examiner* — Thien T Mai
(74) *Attorney, Agent, or Firm* — Schwegman Lundberg & Woessner, P.A.

(57) ABSTRACT

An RFID assembly that includes both a UHF patch antenna and an HF or LF loop antenna is provided. The patch antenna and the loop antenna are arranged inside a housing in such a manner that the loop antenna partially overlaps an end portion of the patch antenna, thereby forming an extension of the patch antenna. In this manner, a performance of the UHF patch antenna can be maintained despite decreasing the size of the same, while an interference between the patch antenna and the loop antenna can be suppressed, in particular, by providing a gap between the same.

18 Claims, 2 Drawing Sheets

(58) Field of Classification Search
CPC ....... G06K 19/07775; G06K 19/07779; G06K 19/0779; G06K 7/10316; G06K 19/07773; G06K 19/07794; G06K 19/0723; G06K 19/072
See application file for complete search history.

(56) References Cited

U.S. PATENT DOCUMENTS

| | | | |
|---|---|---|---|
| 2008/0035741 A1* | 2/2008 | Sakama | H01Q 7/00 235/492 |
| 2012/0074233 A1* | 3/2012 | Finn | G06K 19/07756 235/492 |
| 2012/0111950 A1 | 5/2012 | Worrall et al. | |
| 2015/0053772 A1* | 2/2015 | Holweg | G06K 19/07794 235/492 |
| 2015/0269472 A1* | 9/2015 | Finn | H01Q 7/00 343/870 |
| 2017/0195009 A1* | 7/2017 | Nagai | H04B 5/72 |

FOREIGN PATENT DOCUMENTS

| | | | | |
|---|---|---|---|---|
| JP | 2009081689 A | * | 4/2009 | ........... H01Q 1/2225 |
| WO | WO-2011141860 A1 | * | 11/2011 | ........... H01Q 1/2225 |
| WO | WO-2021121910 A1 | | 6/2021 | |

OTHER PUBLICATIONS

Enhancing Localization Accuracy with Multi-Antenna UHF RFID Fingerprinting (Year: 2015).*
"European Application Serial No. 19218549.4, Extended European Search Report mailed May 25, 2020", 8 pgs.
"European Application Serial No. 19218549.4, Response filed Dec. 9, 2021 to Extended European Search Report mailed May 25, 2020", 17 pgs.
"International Application Serial No. PCT/EP2020/083735, International Search Report mailed Feb. 17, 2021", 5 pgs.
"International Application Serial No. PCT/EP2020/083735, Written Opinion mailed Feb. 17, 2021", 7 pgs.

* cited by examiner

RFID ASSEMBLY

PRIORITY APPLICATION

This application is a national stage application under 35 U.S.C. § 371 of PCT Patent Application Serial No. PCT/EP2020/083735, titled "RFID Assembly," filed Nov. 27, 2020, which claims priority to European Patent Application Serial No. 19218549.4, titled "RFID Assembly," filed Dec. 20, 2019, each of which is incorporated by reference herein in its entirety.

TECHNICAL FIELD

The present disclosure generally relates to RFID (radio-frequency identification) assemblies and RFID tags including such RFID assemblies. In particular, the present disclosure relates to an RFID assembly comprising a UHF (ultra high frequency) antenna and an additional HF (high frequency) or LF (low frequency) antenna.

BACKGROUND

UHF tags and inlays are the RFID technology references in retail, pharma and other industries due to their long range performance and their bulk scanning capabilities. Such tags may be used, for example, for identifying or marking goods such as beverage containers (for, example, beer kegs) and other products, where the UHF tags allow for reading the same at a distance of several meters while passing through, for example, a portal or the like.

On the other hand, passive LF or HF tags are known, which can be read using short-range industrial readers or consumer devices such as NFC-enabled smartphones or the like.

WO 2011/141860 A1 discloses a wideband UHF tag comprising a patch antenna folded around a dielectric support.

The present disclosure is directed, at least in part, to improving or overcoming one or more aspects of prior systems.

SUMMARY OF THE DISCLOSURE

According to one aspect of the present disclosure, an RFID assembly comprises a support having a first surface, a planar first antenna arranged on the first surface, the first antenna being electrically connected to a first integrated circuit, and a second antenna connected to a second integrated circuit. The second antenna partially overlaps the first antenna when viewed in a direction perpendicular to the first surface.

According to another aspect, the present disclosure relates to an RFID tag, in particular, for identifying goods such as beverage containers and the like. The RFID tag comprises a housing and the RFID assembly according to the above aspect.

Other features and aspects of the present disclosure will be apparent from the following description and the accompanying drawings.

DETAILED DESCRIPTION

Figure 1:
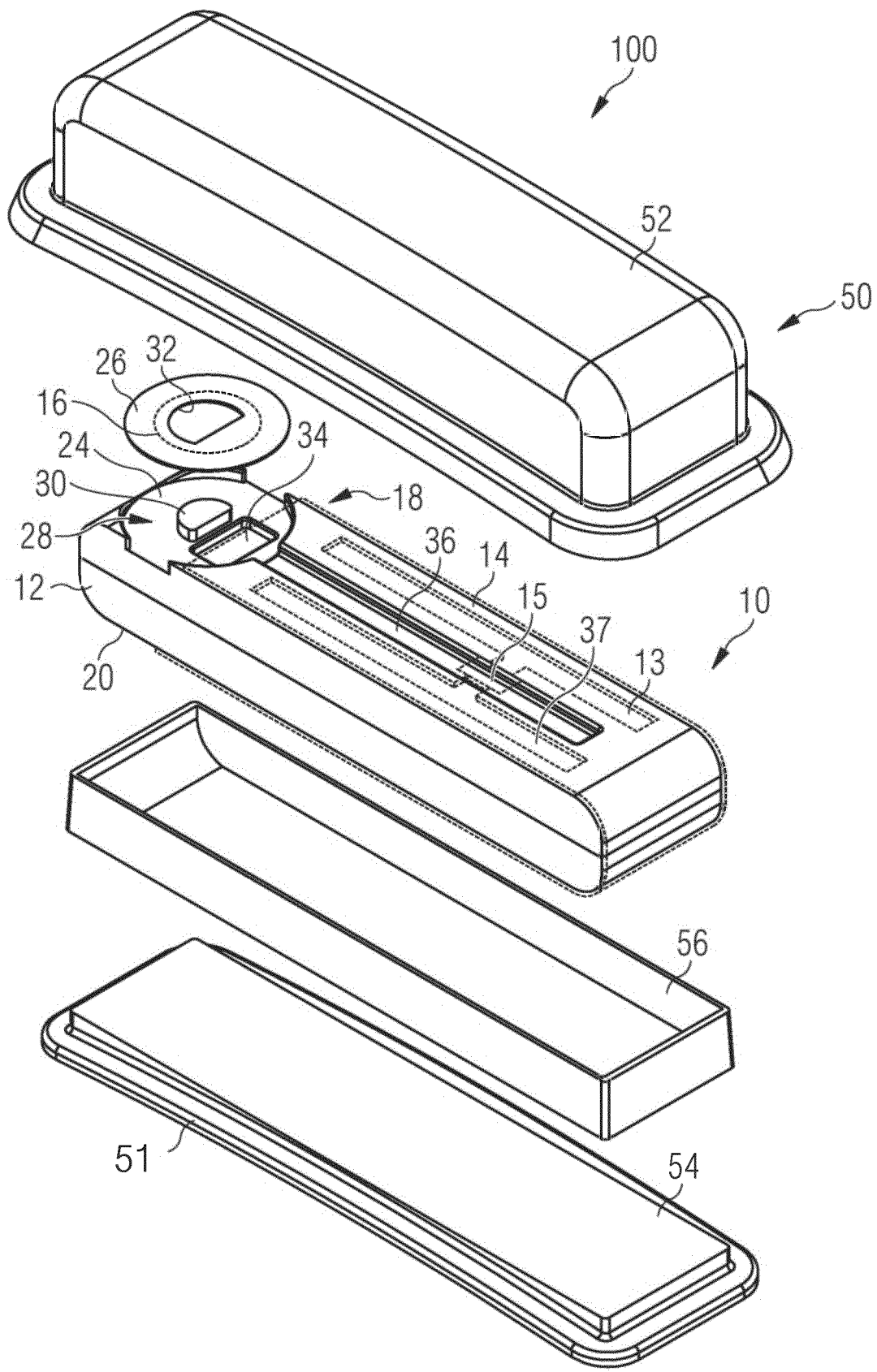
FIG. 1 shows an explosive view of an RFID tag in accordance with the present disclosure.

The following is a detailed description of exemplary embodiments of the present disclosure. The exemplary embodiments described herein are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of protection. Rather, the scope of protection shall be defined by the appended claims.

The present disclosure is based at least in part on the realization that there is a need to embed additional passive technology such as LF or HF technology in UHF tags, for interoperability with industrial readers or for interaction with consumer devices such as NFC-enabled smartphones. In this respect, it has been realized that the different antenna technologies may interfere with each other, and that isolating the antennas from each other to prevent such interference may result in increased dimensions for the tag and/or the corresponding inlay. In order to avoid such an increase in the dimensions, it may be necessary to reduce the space that is occupied by the UHF antenna in order to make room for the second antenna used for LF or HF frequencies. However, the reduction in the size of the UHF antenna reduces the UHF performance, which is problematic in applications where a reliable detection has to be achieved, in particular, in combination with a very long read range. It has been realized that the above disadvantages can be alleviated when the LF or HF antenna is used as an extension of the UHF antenna, thereby at least partially recovering the losses due to the reduction in the size of the UHF antenna.

In particular, it has been realized that, when the length of the UHF antenna, for example, a patch antenna, is reduced to allocate space for an additional HF or LF antenna, the reading range of the UHF antenna is reduced. However, it has been found that some of the performance loss can be recovered by coupling the additional HF or LF antenna to the UHF antenna, such that the HF or LF antenna serves as an extension of the UHF antenna, i.e., has a booster function. To achieve this, it has been realized that it is advantageous when the HF or LF antenna is placed in superposition with the UHF antenna, in particular, slightly below or above the same. In this respect, it has also been found that the overlap between the two antennas should not be too large, as this would negatively affect the read range of the additional HF or LF antenna. Further, it has also been found that the read range of the HF or LF antenna can be improved when there is a small gap between the UHF antenna and the HF or LF antenna. Moreover, it has been realized that the size of the gap should be optimized in order to achieve the best possible performance of the UHF antenna.

The present disclosure is also based at least in part on the realization that, due to assembly process tolerances, it is advantageous to select antenna designs that tolerate a positioning variation. Therefore, using a circular antenna for the HF or LF antenna reduces the variation in case, for example, the overlap between the antennas is too large. In this respect, it is also advantageous when the second antenna, i.e. the LF or HF antenna, is provided on a substrate that can be positioned in a predefined orientation with respect to a support on which the UHF antenna is formed. Thereby, a precise positional relationship between the UHF antenna and the LF or HF antenna can be achieved.

Referring now to the drawings, FIG. 1 shows an exploded view of an exemplary RFID tag 100 in accordance with the present disclosure. As shown in FIG. 1, the RFID tag 100 includes a housing 50 and an RFID assembly 10 embedded in housing 50. In the embodiment, housing 50 is formed from three parts, namely a bottom plate 54, a box-shaped receptacle 56 for receiving RFID assembly 10, and a top cover 52 configured to be connected to bottom plate 54 in order to embed RFID assembly 10 inside housing 50. Bottom plate 54, receptacle 56 and cover 52 may be formed of known synthetic materials such as PA6 or other appropriate materials. The exemplary RFID tag 100 may be used for identifying goods such as beverage containers, in particular, beer kegs or the like. To this end, bottom plate 54 has an arcuate (concave) outer surface 51, which may correspond to the shape of the article to which RFID tag 100 is to be attached, for example, by adhesives or the like.

As shown in FIG. 1, RFID assembly 10 comprises a support 12 having a first surface 13, a planar first antenna 14 (for the sake of illustration, first antenna 14 is indicated by dashed lines in the drawings) arranged on the first surface 13, and a second antenna 16 (also indicated by a dashed line in FIG. 1). In the exemplary embodiment, first antenna 14 is configured as a patch antenna, and second antenna 16 is configured as a loop antenna. However, in other embodiments, the first antenna may also be a different type of planar antenna, for example, a dipole antenna or the like. As such, the term "planar antenna" covers any type of antenna that includes at least a portion that extends in a given plane, for example, on first surface 13, as is the case for the exemplary patch antenna 14. Likewise, in other embodiments, second antenna 16 may have a configuration other than a loop antenna, provided that it can be used as an HF or LF antenna. Support 12 is made from plastic materials such as PC/ABS and is substantially rectangular with rounded-off corners. First surface 13 is a substantially flat surface formed on the upper side of support 12. On the opposite side of support 12, a bottom surface 20, which is also substantially flat, is formed.

A slot 36 is formed in first surface 13 substantially at the center of support 12 in the transverse direction. As will be described in more detail below, slot 36 is aligned with a pair of antenna slots 37 formed in patch antenna 14.

As shown in FIG. 1, support 12 also includes a recess 24 formed in first surface 13. In the present embodiment, recess 24 is substantially circular and continuous with slot 36. As will be described in more detail below, loop antenna 16 is mounted in recess 24 in such a manner that patch antenna 14 is disposed above loop antenna 16.

Patch antenna 14 extends on first surface 13, and also continuously extends around support 12 to second surface 20, in the manner that is known from, for example, WO 2011/141860 A1. As known from said document, patch antenna 14 may include the pair of antenna slots 37 extending in the longitudinal direction of patch antenna 14. A first integrated circuit 15 may be connected over a gap formed in the region between antenna slots 37, as described in WO 2011/141860 A1, and accommodated inside slot 36. It will be appreciated, however, that antennas having different configurations (for example, different shapes) may be used for patch antenna 14. Also, as mentioned above, antenna 14 may be formed as a two-dimensional antenna extending on first surface 13 only.

As shown in FIG. 1, exemplary patch antenna 14 extends along first surface 13 with an elongated shape and has an end portion 18 in a longitudinal direction of the same. As will be described in more detail below, loop antenna 16 partially overlaps end portion 18.

As also shown in FIG. 1, loop antenna 16, which may be an HF antenna, is mounted on substrate 26. In particular, loop antenna 16 is mounted on substrate 26 together with a second integrated circuit 17 to which it is electrically connected (see FIG. 4). In the present embodiment, second integrated circuit 17 is provided on the rear surface of substrate 26.

As will be described in more detail below, loop antenna 16 is mounted on support 12 such that it partially overlaps patch antenna 14 when viewed in a direction perpendicular to first surface 13 of support 12. In order to reliably obtain a desired overlap between patch antenna 14 and loop antenna 16, positioning means 28 for positioning substrate 26 inside recess 24, preferably in a defined orientation with respect to support 12, are provided. In the present embodiment, positioning means 26 include a D-shaped protrusion 30 formed in support 12 and a matching opening 32 configured to receive protrusion 30 formed in substrate 16, as shown in FIG. 1. In the present embodiment, opening 32 is a through hole. However, it will be appreciated that, in other embodiments, opening 32 may be formed as a recess having a bottom. Further, it will be readily appreciated that, in other embodiments, protrusion 30 may be formed in substrate 26, and opening 32 may be formed in support 12. Further, protrusion 30 and opening 32 may have any appropriate shape.

Figure 4:
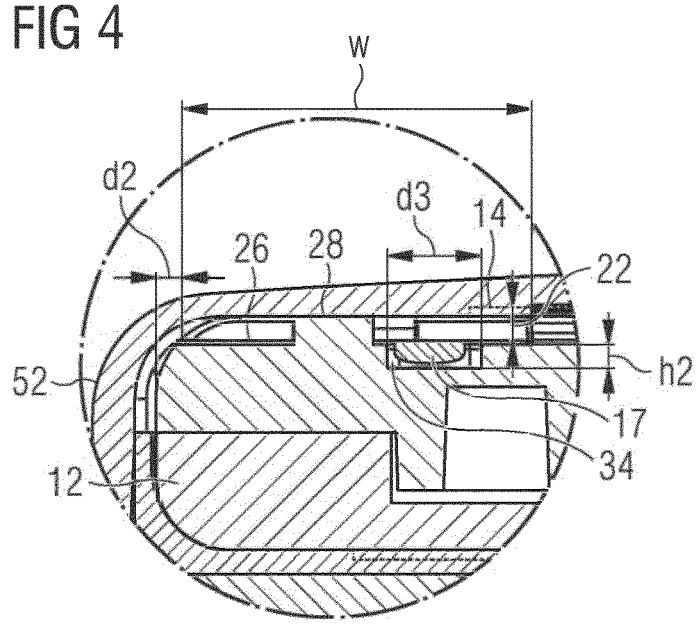
FIG. 4 shows an enlarged detailed view of a portion B in FIG. 3.

As shown in more detail in FIG. 4, a chip recess 34 is formed in a bottom of recess 24, and configured to receive second integrated circuit 17. In this manner, second integrated circuit 17 can be protected inside chip recess 34.

Figure 2:
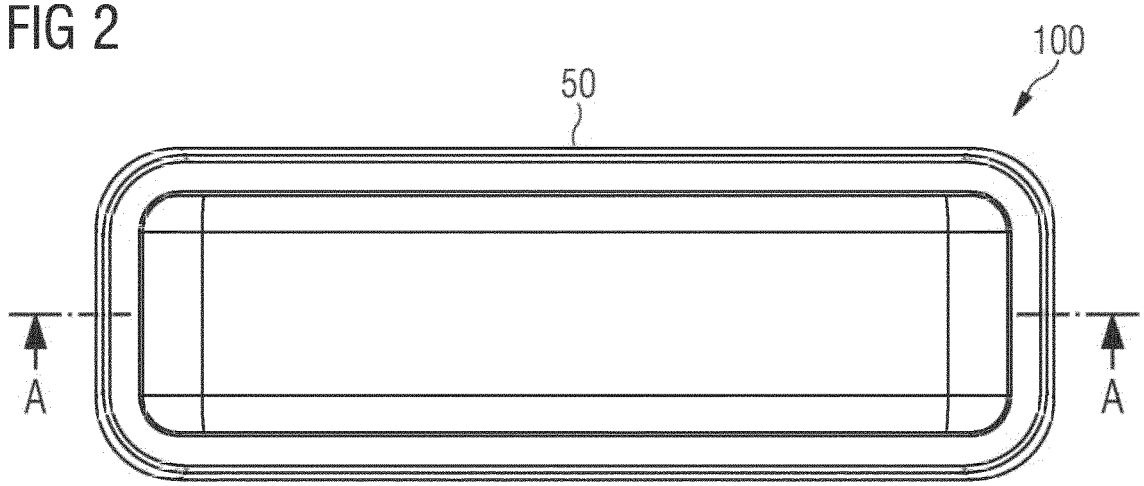
FIG. 2 shows a plan view of the RFID tag of FIG. 1.
Figure 3:
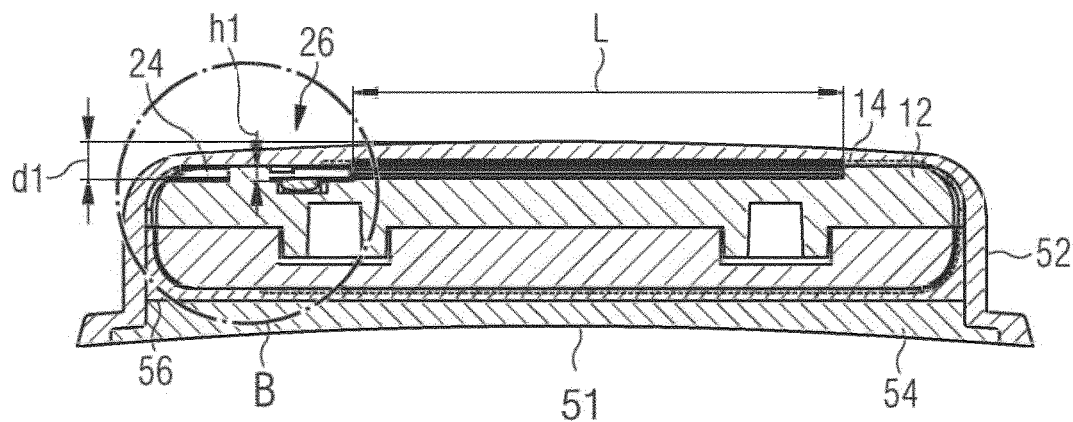
FIG. 3 shows a cross-sectional view along the line A-A in FIG. 2.

FIG. 2 shows a plan view of RFID tag 100 with RFID assembly 10 (see FIG. 1) embedded inside housing 50. FIG. 3 shows a cross-section along the line A-A in FIG. 2.

As shown in FIG. 3, substrate 26 is received inside recess 24 such that a distance d1 is present between the top surface of substrate 26 and the top surface of cover 52. For example, d1 may be around 3 mm. Protrusion 30 has a height h1 of, for example, 1.2 mm. As also shown in FIG. 3, a length l of slot 36 may be, for example, 40 mm.

FIG. 4 shows a detailed view of a portion B indicated by a circle in FIG. 3. As shown in FIG. 4, substrate 26 is positioned inside recess 24 such that there is a distance d2 between the outer edge of substrate 26 and the outer edge of support 12. For example, the distance d2 may be 1 mm. Likewise, a width d3 of chip recess 34 may be, for example, 4 mm. Second integrated circuit 17 may be covered by a protective housing, and is securely protected inside chip recess 34 in a state in which substrate 26 is positioned on the bottom of recess 24.

As can be seen in FIG. 4, the dimensions of recess 24, substrate 26, and support 12 are matched to each other such that, in the state in which substrate 26 is positioned on the bottom of recess 24, a gap 22 is provided between patch antenna 14, which is arranged on first surface 13 of support 12 and partially overlaps loop antenna 16 arranged on substrate 26, and loop antenna 16. For example, the depth of recess 24, which may correspond to the height h1 of protrusion 30, may be chosen such that gap 22 is about 0.8 mm. An exemplary diameter w of recess 24 is, for example, 15 mm, and an exemplary height of chip recess 34 is, for example, 1 mm.

As mentioned above, the present inventors have realized that it is desirable for the performance of the UHF antenna and the HF or LF antenna that an amount of overlap and a size of the gap are chosen such that the performances can be optimized. The inventors found that it is advantageous when the overlap in the longitudinal direction is between 1 mm and 10 mm, preferably between 2 mm and 5 mm, in particular around 3 mm. Likewise, gap 22 should be between 0.1 mm and 3 mm, preferably between 0.2 mm and 1 mm, in particular, 0.8 mm. Therefore, in the exemplary embodiment shown in FIGS. 1 to 4, the dimensions have been chosen such that a distance between loop antenna 16 to a bottom surface of patch antenna 14 is 0.8 mm in the assembled state.

Likewise, patch antenna 14 is provided on support 12 in such a manner that the overlap between end portion 18 and loop antenna 16 when viewed in the direction perpendicular to first surface 13 is around 3 mm. This allows for establishing a sufficient capacitive coupling between patch antenna 14 and loop antenna 16 without resulting in too much interference between said antennas. Therefore, the read range of antenna 14 at the desired frequencies, which may be determined by reader systems already in place, is hardly reduced when compared to the case where HF or LF antenna 16 is not present. This is because the capacitive coupling "extends" the UHF antenna to greater electrical lengths, and therefore increases the antenna gain. Here, the skilled person understands that the read performance of a tag with a UHF antenna is greatly determined by the antenna gain of the UHF antenna. Likewise, the read range of antenna 16 does not deteriorate significantly due to interference with UHF antenna 14. In other words, an energy loss due to the presence of a metal object (the UHF antenna) in the vicinity of the HL or LF antenna is reduced. Here, the skilled person understands that patch antenna 14 being a UHF antenna may have a read range of several meters, for example, up to 10 meters, at frequencies of, for example, 870 MHz and 920 MHz. In the same manner, loop antenna 16, which may be an HF antenna, has a read range of several millimeters, for example, between 20 and 40 mm, for example, around 30 mm. Of course, the skilled person will immediately recognize that these values are only exemplary, and depend on the specific sizes of the antennas, and the specific wavelengths that are used to interrogate the RFID assembly. As previously mentioned, the advantageous effects described above may also be obtained when using antenna configurations that differ from the patch antenna and the loop antenna described above, as long as an extension of the UHF antenna by the HF or LF antenna due to the capacitive coupling resulting from a partial overlap is achieved.

INDUSTRIAL APPLICABILITY

As described above, with the RFID assembly in accordance with the present disclosure, a combo RFID tag including both a UHF antenna and an LF or HF antenna can be achieved, which has an overall good performance for both antennas and does not result in an increased size of the RFID tag, for example, when compared to an RFID tag that includes a UHF antenna only. The RFID assembly can be used, for example, in an RFID tag that is used for identifying goods such as beverage containers, in particular, beer kegs or the like. To this end, as previously mentioned, the shape of an outer surface of RFID tag 100 may be in conformity with the shape of the outer surface of the article to which the tag should be attached. The RFID tag of the present disclosure allows for bulk scanning of the article from a distance of up to 10 meters, while at the same time allowing for scanning by industrial or consumer devices such as smartphones using NFC or the like, from a distance of a few centimeters. Therefore, the RFID tag of the present disclosure is very versatile and can be universally used.

Although it has been described above that antenna 16 is an HF antenna, it will be appreciated that, in other applications, antenna 16 may be an LF antenna or the like.

Further, while in the embodiment antenna 16 is disposed under planar antenna 14, it will be readily appreciated that, in other embodiments, antenna 16 may be disposed above planar antenna 14 and partially overlap the same. Clearly, the same effects can be achieved in case of an overlap instead of an "underlap" as described above. To facilitate precise positioning of antenna 16 also in this case, for example, a recess or the like may be formed in top cover 52 to accommodate substrate 26. In other embodiments, substrate 26 and antenna 16 may also be mounted to support 12 indirectly, for example, via planar antenna 14. For example, a spacer may be provided on a top surface of planar antenna 14, and substrate 26 may be mounted on said spacer, for example, in a defined positional relationship using positioning means as described above.

Of course, it will also be appreciated that, in some embodiments, substrate 26 may be omitted, and antenna 16 may be directly provided on support 12, or may be directly mounted to the same via a spacer provided on planar antenna 14. In such cases, second integrated circuit 17 may also be mounted in an appropriate manner.

Further, it will be appreciated that planar antenna 14 may have any appropriate shape and size. For example, antenna slots 37 may not be provided in planar antenna 14.

As described above, according to the present disclosure, planar antenna 14 and antenna 16 are not electrically connected to each other, i.e., are not connected to each other by electrical conductors. Instead, planar antenna 14 and antenna 16 are capacitively coupled to each other to achieve the above-described effects.

It will be readily appreciated that the shape and size of RFID tag 100, in particular, housing 50 of the same, can be selected in any appropriate manner, and are not limited to the shapes and sizes described above with respect to the exemplary drawings. Therefore, in particular, an outer surface of housing 50 may have any appropriate shape that is suitable for securely attaching the same to an article or the like. In addition, any appropriate materials may be used for support 12 and housing 50.

It will be appreciated that the foregoing description provides examples of the disclosed systems and methods. However, it is contemplated that other implementations of the disclosure may differ in detail from the foregoing examples. All references to the disclosure or examples thereof are intended to reference the particular example being discussed at that point and are not intended to imply any limitation as to the general disclosure.

Recitation of ranges of values herein are merely intended to serve as a shorthand method for referring individually to each separate value falling within the range, unless otherwise indicated herein, and each separate value is incorporated into the specification as if it were individually recited herein. All method steps described herein can be performed in any suitable order, unless otherwise indicated or clearly contradicted by the context.

Although the preferred embodiments of the present disclosure have been described herein, improvements and modifications may be incorporated without departing from the scope of the following claims.

The invention claimed is:

1. An RFID assembly comprising:
a support having a first surface;
a planar ultra high frequency (UHF) antenna with a read range of several meters, the UHF antenna being arranged on the first surface with an elongated shape and being electrically connected to a first integrated circuit; and
a high frequency (HF) or low frequency (LF) antenna with a read range of several millimeters, the HF or LF antenna being connected to a second integrated circuit and partially overlapping an end portion of the UHF antenna in a longitudinal direction of the same when viewed in a direction perpendicular to the first surface enabling capacitive coupling between the UHF antenna and the HF or LF antenna;
wherein an air gap is provided in the direction perpendicular to the first surface between the UHF antenna and the HF or LF antenna where the HF or LF antenna partially overlaps the end portion of the UHF antenna.

2. The RFID assembly of claim 1, wherein the overlapping in the longitudinal direction is between 1 mm and 10 mm.

3. The RFID assembly of claim 1, wherein the air gap is between 0.1 mm and 3 mm.

4. An RFID assembly comprising:
a support having a first surface;
a planar ultra high frequency (UHF) antenna with a read range of several meters, the UHF antenna being arranged on the first surface with an elongated shape and being electrically connected to a first integrated circuit; and
a high frequency (HF) or low frequency (LF) antenna with a read range of several millimeters, the HF or LF antenna being connected to a second integrated circuit and partially overlapping an end portion of the UHF antenna in a longitudinal direction of the same when viewed in a direction perpendicular to the first surface enabling capacitive coupling between the UHF antenna and the HF or LF antenna;
wherein the support includes a recess formed in the first surface, the HF or LF antenna and the second integrated circuit being mounted in the recess and the overlapped end portion of the UHF antenna being disposed above the HF of or LF antenna.

5. The RFID assembly of claim 4, wherein the HF or LF antenna is mounted on a substrate together with the second integrated circuit, the recess being configured to receive the substrate.

6. The RFID assembly of claim 5, further comprising positioning means for positioning the substrate inside the recess.

7. The RFID assembly of claim 6, wherein the positioning means include a protrusion formed in one of the support and the substrate, and a matching opening configured to receive the protrusion formed in the other one of the support and the substrate.

8. The RFID assembly of claim 5, further comprising a chip recess formed in a bottom of the recess and configured to receive the second integrated circuit, the second integrated circuit being provided on a rear surface of the substrate.

9. The RFID assembly of claim 1, further comprising a slot formed in the first surface, a longitudinal direction of the slot being aligned in a same longitudinal direction as a pair of antenna slots formed in the UHF antenna.

10. The RFID assembly of claim 1, wherein the UHF antenna is a patch antenna, the HF or LF antenna is a loop antenna, and the HF or LF antenna is arranged in a plane parallel to the first surface.

11. An RFID tag comprising:
a housing; and
the RFID assembly of claim 4 embedded in the housing.

12. The RFID tag of claim 11, wherein the housing includes a concave bottom surface.

13. The RFID tag of claim 11, wherein an air gap is provided in the direction perpendicular to the first surface between the UHF antenna and the HF or LF antenna where the HF or LF antenna partially overlaps the end portion of the UHF antenna.

14. The RFID tag of claim 11, wherein the HF or LF antenna is mounted on a substrate together with the second integrated circuit, the recess being configured to receive the substrate.

15. The RFID tag of claim 14, further comprising positioning means for positioning the substrate inside the recess.

16. The RFID tag of claim 14, further comprising a chip recess formed in a bottom of the recess and configured to receive the second integrated circuit, the second integrated circuit being provided on a rear surface of the substrate.

17. The RFID tag of claim 11, further comprising a slot formed in the first surface, a longitudinal direction of the slot being aligned in a same longitudinal direction as a pair of antenna slots formed in the UHF antenna.

18. The RFID tag of claim 11, wherein the UHF antenna is a patch antenna, the HF or LF antenna is a loop antenna, and the HF or LF antenna is arranged in a plane parallel to the first surface.

* * * * *